Feb. 20, 1940.  L. D. SEARCY  2,190,804
HEATER FOR CLOSED VEHICLES
Filed June 24, 1937
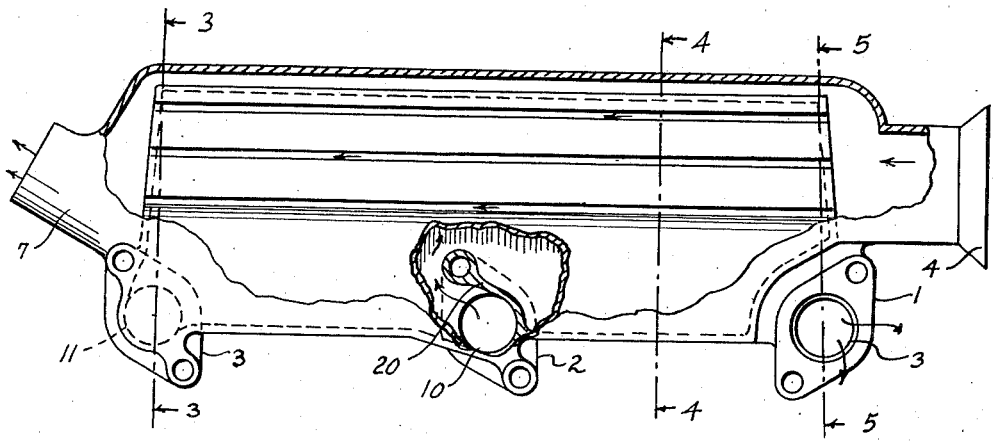
Fig. 2.
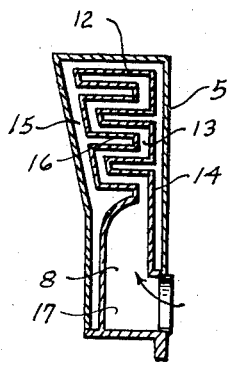
Fig. 3.
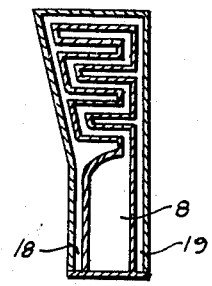
Fig. 4.
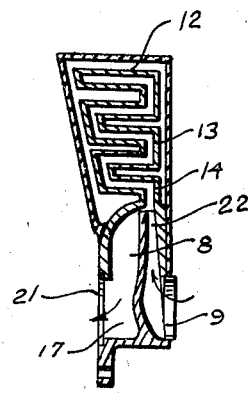
Fig. 5.
Fig. 1.
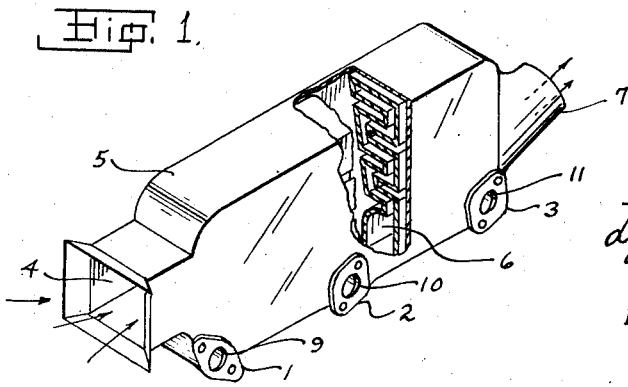
Lynn D. Searcy
INVENTOR.
BY A.B. McCall
ATTORNEYS.

Patented Feb. 20, 1940

2,190,804

UNITED STATES PATENT OFFICE 2,190,804

HEATER FOR CLOSED VEHICLES

Lynn D. Searcy, St. Clair Shores, Mich.

Application June 24, 1937, Serial No. 150,090

2 Claims. (Cl. 257—241)

My invention relates to heaters for closed vehicles and more especially to vehicles propelled by an engine; an object being in my heater to provide a warm air heater adapted to be operatively secured to the exhaust ports of an automobile engine and connected in a manner with the body of a closed automobile that will permit the engine fan when rotating to force a continuous supply of fresh air into said automobile body as it passes through the heater where the air is warmed by contact with heating coils within my heater that are heated by the hot exhaust gases normally passing out through the exhaust manifold of the automobile engine.

A further object of my engine is to provide a warm air manifold heater for heating closed automobile bodies and with it a heater that can be manufactured economically and can be operated very efficiently.

A particular purpose of my invention is to provide a manifold heater for the warm air heating of automobile bodies and a type of heater which is not only economical to make and convenient to install, but which is made of a design which permits the hot gases to move through a series of relatively thin channels while at the same time, I provide a chamber defined by a casing around those channels in such a design as will permit the fresh air also to move through relatively thin channels on the outside of the hot gas chamber.

I attain the objects of my invention by my heater described in the annexed specification, recited in the claims and illustrated in the accompanying drawing in which like reference numerals indicate like parts in the figures.

Referring to the figures:

Fig. 1 is a perspective view of my heater showing in a cut-away details of the construction thereof.

Fig. 2 is a side view of my invention while this figure discloses in a cut-away the position of the heating unit within the casing and also showing in the cut-away a detail of a baffle plate over the central exhaust port by which the hot gases are deflected in their movement, being required to move through a greater area in the heating unit before leaving the heater as waste gases.

Fig. 3 is a section taken from 3 to 3 on Fig. 2.

Fig. 4 is a section taken from 4 to 4 on Fig. 2.

Fig. 5 is a section taken from 5 to 5 on Fig. 2.

I am aware of the fact that from time to time there has appeared on the market car heaters using warm air as the heating medium as well as hot water heaters but in my invention it is my purpose to provide a warm air manifold heater for automobile closed bodies, which heater is developed on the scientific plan of moving the hot exhaust gases through a gas chamber relatively thin in form where the heating unit is defined in a manner which will force the hot gases to pass through relatively thin channels which are communicatively connected and which have a larger part of the heating unit as the walls thereof shaped so that the gases will be forced to move through these thin channels; while at the same time the fresh air, to be heated by said gases within a casing enclosing the heating unit, is forced to move through the chamber shaped thereby just outside of the heating unit in a manner moving the fresh air also through relatively thin channels about the heating unit.

Thus by permitting the hot gases to pass through relatively thin communicating channels and the fresh air moving through the heater casing about the thin channels of the heating unit, the hot gases will transfer their heat more readily over more heating surface while the fresh air receives application of transferred heat in a rather thin volume outside of any one of the heating surfaces of the heating unit causing the fresh air to heat quickly as it moves through the heater.

Referring now to the preferred construction of my invention and the manner of operating the same, I have chosen to illustrate a manifold heater adapted to be operatively secured to the right bank exhaust ports of a V-type eight-cylinder engine;

However, for the sake of explanation of the merits of my invention, I choose to explain these merits by referring to the form of my invention which uses means of attachment to three exhaust ports of an automobile engine.

I have not illustrated in the drawing an automobile engine for the reason that it is thought to be unnecessary for the purpose of explaining the merits of my invention; but my heater is of such construction as will permit it to replace the automobile exhaust manifold of a car engine; while for the sake of explanation it may be said that integral collar 1 will be secured to the front exhaust port of the engine, intermediate collar 2 will be secured to the intermediate exhaust port of the engine while collar 3 is bolted to the rear exhaust port of the engine.

The fresh air to be heated by my heater is blown by the car engine fan (not shown) into the entrance 4 of casing 5 which surrounds the heating unit 6 and leaves the heater casing through an outlet 7 thereof as it is blown directly into a vehicle or car body known as a closed body type.

It will be noted that when the exhaust gases from the car engine enter my manifold type of warm air heater they are freely blown into the gas chamber 8 through necks 9, 10 and 11 where they have more freedom of movement at the bottom than they would at the top of the gas chamber.

For instance, when the hot gases enter gas chamber 8 through neck 11 of my heater they are free to move forwardly and upwardly where they enter the relatively thin gas channels 12. These channels are communicatively connected along their sides 13 by the zig-zag formation of the heating unit body 14 which is so shaped that there is provided a much greater heating surface to permit the hot gases to transfer their heat more efficiently to the fresh air. This fresh air moves along the outer surface of heating unit 14 and between the relatively thin channels 12 defined by the upper zigzag part of the unit 14.

This thin passage 15 for the fresh air within the casing 5 forces the fresh air in thin volumes to move past heating unit 14 and between the zigzag channels 12 thereof so that the air will be heated more quickly in this manner as it is effectively and speedily blown through the heater.

It will be noted that the fresh air chamber not only includes passage 15 about heating unit 14 but it includes those relatively thin recesses 16 between the zigzag turns in heating unit 14.

I also provide for casing 5 to surround the lower part 17 of heating chamber 8 and thus define a lower portion 18 of the fresh air channel on one side and 19 on the other, where casing 5 is spaced a little ways from heating unit 14.

The hot gases entering gas chamber 8 through neck 11 will move up over the central baffle plate 20 about neck 10 on their way back to what I choose to call the exhaust port 21 of my heater; while the hot gases entering my heating unit 14 through neck 10 are thrown rearwardly by baffle 20 causing such hot gases to move through the heating unit 14 in a less direct movement. This will carry them rearwardly at first and then up through the series of relatively thin gas channels 12 before they move forwardly up over baffle 20 and ultimately out through my exhaust port 21 at the forward end of the heater.

If the exhaust gases entering my heater through neck 9 adapted to be operatively connected with the forward exhaust port of the engine, were permitted to enter directly into gas chamber 8 they would necessarily be blown directly through this chamber and out through my exhaust port 21 which is preferably in direct line with neck 9 which receives such gases from the engine; but to avoid this unnecessary loss of the hot gases before utilizing their heat, I have provided a baffle plate member 22 directly in front of neck 9 which will force these hot gases upwardly as is indicated by the arrow in Fig. 5, when they enter through neck 9 forcing them to speedily move up into the relatively thin channels 12 connected by passages 13 in the heating unit 14 before they again come down to the lower portion 17 of chamber 8 from which they are ultimately released through my exhaust port 21 as indicated by the second arrow in Fig. 5.

With my invention, I utilize practical and dependable principles of heat transfer and with my heater I effect this result in a most efficient and speedy manner.

Having thus described the nature of my invention, what I claim is:

1. In a manifold type heater for closed vehicles adapted to be communicatively connected with the exhaust ports of an automobile engine; a manifold element elongated and shaped to define a series of super-imposed channels communicatively connected along alternate opposite sides; said channels defining, as a unit, a hot gas chamber for the accommodation of the moving exhaust gases leaving said ports; a metallic housing about said heating unit and spaced therefrom in a manner defining a relatively thin air passage between said heating unit channels and about them, openings in the forward and rear ends of said housing for receiving and discharging fresh air respectively as it passes through the housing to be warmed by said heating unit.

2. In a heater for closed vehicles having a housing adapted to be communicatively connected with a closed vehicle at one end and equipped to receive a forceful charge of fresh air at the other end and supported by the exhaust ports of a vehicle engine; a warm air heating unit for heating said fresh air adapted to pass through said housing and comprising an elongated manifold closure shaped to define a relatively wide gas chamber along the bottom thereof and having its upper portion shaped in the form of a plurality of relatively thin zigzagged communicating and super-imposed channels defining an upper gas chamber in conjunction with said lower gas chamber; said heating unit supported by the exhaust ports of said vehicle engine and communicatively connected therewith, a baffle member on one side of one of the intermediate exhaust ports for directing the hot gases entering said lower chamber through said upper gas chambers before passing to a gas discharge port therefor and a second baffle plate in front of an end gas port of said engine for directing the exhaust gases from said port first up into said upper channels of said gas heating unit before they circulate through said lower gas chamber communicatively connected therewith and are released from an exhaust port defining a gas discharge opening in said lower gas chamber of said heating unit.

LYNN D. SEARCY.